United States Patent Office 2,760,997
Patented Aug. 28, 1956

2,760,997

PROCESS FOR THE PRODUCTION OF CHLOROTRI-FLUOROETHYLENE BY PASSING A MIXTURE OF TRICHLOROTRIFLUOROETHANE AND HYDROGEN THROUGH AN UNOBSTRUCTED IRON TUBE

John T. Rucker, Lewiston, and Dean B. Stormon, Niagara Falls, N. Y., assignors to Hooker Electrochemical Company, Niagara Falls, N. Y., a corporation of New York No Drawing. Application August 16, 1954,
Serial No. 450,214

16 Claims. (Cl. 260—653)

This invention relates to an improved process for the production of chlorotrifluoroethylene (ClFC=CF$_2$) from 1,1,2-trichloro-1,2,2-trifluoroethane (Cl$_2$FC—CF$_2$Cl) also called "Freon" 113, "Freon" being the registered trademark of E. I. du Pont de Nemours & Company, Wilmington, Delaware, for this material. More particularly, this invention relates to a commercial process wherein hydrogen and "Freon" 113 are passed through an open iron reaction zone at elevated temperatures to produce ultimately a high yield of chlorotrifluoroethylene.

In the past chlorotrifluoroethylene has been prepared from "Freon" 113 by several known catalytic methods. The main catalytic method has been the conversion by the so-called "zinc-methanol process" (see Locke et al., J. Am. Chem. Soc. 56:1736 (1934)). On a commercial basis the processing costs of this liquid phase reaction have been unsatisfactory, mainly due to cost of zinc and methanol.

A second catalytic method is that disclosed by C. A. Bordner, in U. S. Patent 2,615,925, wherein hydrogen and "Freon" 113 are passed through an "inert" tube packed with a metallic copper catalyst at a temperature between about 360 and about 480 degrees centigrade. The yields reported are no higher than about 77 per cent. Also, there are many problems to this process which make it uneconomical to adapt into a commercial installation. The catalyst packed in the inert tube reacts with the hot HF and HCl gases to form copper chlorides and copper fluorides which soon plug the tube and thus presents a problem of high maintenance costs. In addition, it has been found that the catalysts used by Bordner give relatively low yields and very large proportions of by-products which are mainly trifluoroethylene, and the method is even poorer than the zinc-methanol process.

An earlier patent also issued to C. A. Bordner, namely U. S. Patent 2,504,919, discloses a method for producing olefins wherein hydrogen and the polychlorohydrocarbons are passed through a glass tube packed with a metallic copper catalyst or a catalyst of firebrick cakes impregnated with reduced iron. We have applied this process to the production of chlorotrifluoroethylene from "Freon" 113 and have found that neither the copper nor iron packings are at all usable due to extremely rapid chemical attack on them. In addition, if a glass tube is used, it is attacked very rapidly by the by-product HF formed by the reactants during the conversion.

A recent British Patent 698,386, issued to Union Carbide and Carbon Corporation, shows or suggests the conversion of "Freon" 113 with hydrogen to chlorotrifluoroethylene by passing the vapors through a hot nickel or stainless steel tube packed with a catalyst of nickel chloride, cobalt, copper, platinum or palladium, deposited on a carrier of graphite or activated carbon. Here, again, the same disadvantages which arose in the processes of Bordner, also become apparent in this process. In addition active carbon and graphite give low yields and high HF, and further, nickel chloride on a carrier of Al$_2$O$_3$ produced only by-products.

Thus it is an object of this invention to provide an improved method for the production of chlorotrifluoroethylene, which gives a high ultimate yield of the desired product. A further objective is to provide a method which does not require as much operating expense as the past processes have required. A third object is to provide a new and different method for effecting the conversion of "Freon" 113 to chlorotrifluoroethylene. A fourth object is to provide a method for effecting the conversion with substantially no carbonization occurring. A fifth object is to provide a method for effecting the conversion with surprisingly small amounts of by-products being formed. A sixth object is to provide a method for effecting the conversion in which the by-products that are formed can be chlorinated to "Freon" 113 for use in the process.

These and other related objects can be accomplished in accordance with our invention by the process which comprises passing vapors of 1,1,2-trichloro-1,2,2-trifluoroethane ("Freon" 113) admixed with hydrogen in a mole ratio of from 0.2:1.0 to 4.0:1.0 through an unobstructed iron reaction zone maintained at a temperature of from about 550 to about 600 degrees centigrade. The "Freon" 113 which is unreacted after passing through the unobstructed iron reaction zone, can be recycled to the process. We have discovered that substantially no carbonization occurs, and the small amounts of by-products that are formed can be chlorinated in yields over 90 per cent to "Freon" 113 for reuse. We have discovered that this method for effecting the conversion gives an ultimate yield of chlorotrifluoroethylene above 90 per cent. Thus a preferred method of effecting the conversion of "Freon" 113 to chlorotrifluoroethylene with hydrogen comprises: passing as starting materials the vapors of 1,1,2-trichloro-1,2,2-trifluoroethane admixed with hydrogen in a ratio of from 0.2:1.0 to 4.0:1.0 through an unobstructed iron reaction zone maintained at a temperature between about 550 and about 600 degrees centigrade, separating the hydrogen halides and chlorotrifluoroethylene from the effluent organic products, perchlorinating the remaining organic effluent to form a product comprising 1,1,2-trichloro-1,2,2-trifluoroethane ("Freon" 113) and recycling "Freon" 113 as starting material. Another embodiment for handling the effluent products is separating the hydrogen halides, the chlorotrifluoroethylene and the organic by-products from the unreacted "Freon" 113, chlorinating the organic by-products to form a product comprising at least 90 mole per cent "Freon" 113, and combining this "Freon" 113 with the unreacted "Freon" 113 for recycling as starting material.

The main chemical reaction of the process of this invention is believed to be as follows:

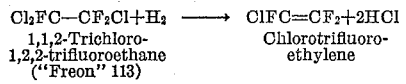

$$Cl_2FC-CF_2Cl + H_2 \longrightarrow ClFC=CF_2 + 2HCl$$
1,1,2-Trichloro-1,2,2-trifluoroethane ("Freon" 113) → Chlorotrifluoro-ethylene Simultaneously, but in minor proportions, two by-products are formed, presumably as follows:

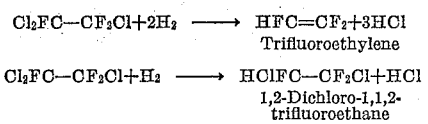

$$Cl_2FC-CF_2Cl + 2H_2 \longrightarrow HFC=CF_2 + 3HCl$$
Trifluoroethylene $$Cl_2FC-CF_2Cl + H_2 \longrightarrow HClFC-CF_2Cl + HCl$$
1,2-Dichloro-1,1,2-trifluoroethane We have found that these two by-products can be chlorinated back to "Freon" 113 for re-use presumably in accordance with the following equations:

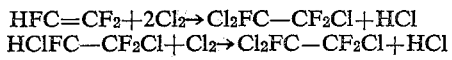

$$HFC=CF_2 + 2Cl_2 \rightarrow Cl_2FC-CF_2Cl + HCl$$
$$HClFC-CF_2Cl + Cl_2 \rightarrow Cl_2FC-CF_2Cl + HCl$$

The "Freon" 113 thus formed can be recycled for use with the fresh feed "Freon" 113 to be hydrogenated to chlorotrifluoroethylene in the unobstructed iron reaction zone of this invention. The hydrogen chloride formed also may be recycled with the "Freon" 113 without unduly affecting the subsequent hydrogenation reaction, or the hydrogen chloride (HCl) may be separated from the "Freon" 113 for other uses.

At this point a clarification of the nomenclature will assist the reader insofar as the terms "yield" and "conversion" are concerned. In our invention there are three preferred methods with which "yields" and "conversions" are associated, namely, Preferred Method 1 is a one-step process defined herein as "Step 1":

Step 1:

$$H_2 + \text{"Freon" 113} \underset{(F_1)}{\longrightarrow} \text{"Freon" 113} + \underset{(F_2)}{\text{Chlorotrifluoroethylene}} + \text{By-products} + \text{Losses} + HCl$$
$$\phantom{H_2 + \text{"Freon" 113}} \phantom{\longrightarrow} \phantom{\text{"Freon" 113}} \phantom{+} \phantom{\underset{(F_2)}{\text{Chlorotrifluoro-}}} (M)$$

where:
F₁—feed "Freon" 113 (moles)
F₂—unreacted "Freon" 113 (moles)
M—chlorotrifluoroethylene (moles)

The term "conversion" is used when referring to Preferred Method 1 and is defined as:

$$\frac{F_1 - F_2}{F_1}$$

The term "yield" is used when referring to Preferred Method 1 and is defined as the product chlorotrifluoroethylene resulting from the conversion, that is:

$$\frac{M}{F_1}$$

Preferred Method 2 is a two-step process comprising Step 1 of Preferred Method 1 above and the additional embodiment of recycling the unreacted "Freon" 113 (F₂) for use in the feed, defined as "Step 2."

Step 2:

$$H_2 + \text{"Freon" 113} \underset{(F_2)}{\longrightarrow} \text{"Freon" 113} + \text{Chlorotrifluoroethylene} + \text{By-products} + \text{Losses} + HCl$$

When referring to this preferred method the term "gross conversion" is used and it is defined as:

$$\frac{F_1 - F_2}{F_1}$$

and similarly, the "gross yield" of Preferred Method 2 is defined as:

$$\frac{M}{F_1 - F_2}$$

Preferred Method 3 is a three-step process comprising Step 1 and Step 2 of Preferred Method 2 above, and the additional embodiment of chlorinating the by-products to "Freon" 113 (F₃) for re-use as feed, defined as "Step 3."

Step 3:

$$\text{By-products} + Cl_2 \longrightarrow \text{"Freon" 113} + \text{Losses} + HCl$$
$$\phantom{\text{By-products} + Cl_2 \longrightarrow} (F_3)$$

When referring to this method the term "net conversion" is used, and is defined as:

$$\frac{F_1 - F_2 - F_3}{F_1}$$

and similarly, the term "net yield" of Preferred Method 3 is defined as:

$$\frac{M}{F_1 - F_2 - F_3}$$

Thus, the term "ultimate yield" refers to final yield in general terms of any method for effecting the conversion and "yield" refers to Preferred Method 1. "Gross yield" and "net yield" refer to the final yields in a particular preferred method, namely, Preferred Method 2 and Preferred Method 3, respectively. Other preferred embodiments also exist in the process of this invention as will be more fully described below but it is believed that they will not cause confusion to the reader insofar as the nomenclature is concerned and we do not wish to be limited to the above three preferred methods for this reason, except as defined in the appended claims.

Table 1 shows how yields of chlorotrifluoroethylene and of by-products vary with the degree of conversion when the reaction is conducted at approximately the optimum conditions for effecting the tabulated degree of conversion. Such near-optimum conditions for effecting the various conversions are shown in Table 2.

Table 1 shows that the losses of products (column VI) increase and the net yields of chlorotrifluoroethylene (column XII) decreases as the gross conversion (column III) increases from 15 per cent to 63 per cent. The net conversions corresponding to these gross conversions of 15 per cent and 63 per cent are 12 per cent and 51 per cent, respectively. At the higher conversions increased proportions of fluorine are lost as HF. We have found that undesirable loss of chlorine from the "Freon" 113 molecule can be replaced by chlorination of the by-products back to "Freon" 113 and recycling this product with the feed "Freon" 113, but removal of any fluorine from the "Freon" 113 molecule represents an unrecoverable loss of "Freon" 113; and hence, a loss in ultimate yield of the desired chlorotrifluoroethylene. We prefer to operate within a gross conversion range between about 30 and about 45 per cent which corresponds to a net conversion range of "Freon" 113 of between about 24 per cent and about 36 per cent. The preferred operating conditions which will provide this range of conversions are a mole ratio of "Freon" 113 to H₂ of between about 2.5 to 1.0 and about 1.5 to 1.0; a retention time of between about 1.8 seconds and about 2.3 seconds; and a reaction tube temperature of about 575 degrees centigrade. Within this range we prefer reaction conditions of about 2.0 to 1.0 mole ratio of "Freon" 113 to H₂; 2.0 seconds retention time, and about 575 degrees centigrade which will provide a gross conversion of about 38 per cent with a net conversion of about 30 per cent.

The mole ratio of "Freon" 113 to hydrogen (H₂) should be within the range of 0.2 to 1.0 and 4.0 to 1.0 to obtain the results of this invention. More preferably, a ratio of "Freon" 113 to hydrogen (H₂) of 1.0 to 1.0 and 4.0 to 1.0 should be employed. When employing a mole ratio of "Freon" 113 to hydrogen which is low, such as on the order of 0.2 to 1, although the process is operative, the percentage of the hydrogen is so increased that the difficulty of recovering the organic vapors from the non-condensable gas is greatly increased. At the higher mole ratios of "Freon" 113 to hydrogen, such as on the order of 4 to 1, the percentage of hydrogen is less than at the 0.2 to 1 ratio and the recovery of the hydrogen is therefore facilitated. In general, at lower gross conversions higher mole ratios of "Freon" 113 to hydrogen are desirable than when high gross conversions are desired. Under the more preferred operation of this invention, at gross conversion of 38 per cent, the most desirable reaction conditions to use are a retention time of about 2.0 seconds, a reaction temperature of about 575 degrees centigrade, and a mole ratio of "Freon" 113 to hydrogen of about 2.0 to 1.0.

TABLE 1

*Yields as a function of conversion[1]*

| I | II | III | IV | V | VI | VII | VIII | IX | X | XI | XII |
|---|---|---|---|---|---|---|---|---|---|---|---|
| | | | Products Collected | | | | "Freon" 113 Recovered from Chlorinated By-Products | | | | |
| "Freon" 113 Fed, Moles | Gross "Freon" 113 Reacted, Moles | Gross Conversion, Percent | Chlorotrifluoroethylene, Moles | By-Products, Moles | Losses, Moles | Total, Moles | Moles | Per cent of Theory | Net "Freon" 113 Reacted, Moles | Net Conversion of "Freon" 113, Percent | Net Yield of Chlorotrifluoroethylene, Percent |
| 633.3 | 95 | 15 | 82 | 12 | 1 | 95 | 11.4 | 95 | 83.6 | 13.2 | 98.0 |
| 316.6 | 95 | 30 | 74 | 20 | 1 | 95 | 18.8 | 94 | 76.2 | 24.1 | 97.1 |
| 249.9 | 95 | 38 | 72 | 21 | 2 | 95 | 19.6 | 93.5 | 75.4 | 30.2 | 95.6 |
| 211.1 | 95 | 45 | 69 | 22 | 4 | 95 | 20.5 | 93 | 74.5 | 35.3 | 92.6 |
| 150.9 | 95 | 63 | 56 | 34 | 5 | 95 | 30.6 | 90 | 64.4 | 42.7 | 87.0 |

[1] Conditions: Best reaction conditions for effecting the tabulated gross conversions are given in Table 2.
Explanation of columns: III=100 (II÷I); IX=100 (VIII÷V); X=II−VIII; XI=100 (X÷I); XII=100 (IV÷X).

Likewise the retention time that the "Freon" 113 and hydrogen are in contact with the hot iron reaction zone depends on various factors including the temperature of the reaction zone, the mole ratio of "Freon" 113 to hydrogen and the degree of conversion desired. In general, a higher retention time is used when operating at a temperature in the lower portion of the stated temperature range, and a lower retention time is used when operating at a temperature in the upper portion of the stated temperature range.

Table 2 shows the approximate optimum reaction conditions for operating the process of our invention to obtain the maximum yields of chlorotrifluoroethylene at gross conversions of "Freon" 113 ranging from 15 per cent to 63 per cent when the iron reaction zone temperature is maintained substantially constant at 575±5 degrees centigrade.

TABLE 2

| Gross Conversion, Percent | Mole Ratio of "Freon" 113 to $H_2$ | Retention Time, Seconds |
|---|---|---|
| 15 | 4.0 to 1.0 | 1.5 |
| 30 | 2.5 to 1.0 | 1.8 |
| 38 | 2.0 to 1.0 | 2.0 |
| 45 | 1.5 to 1.0 | 2.3 |
| 63 | 1.0 to 1.0 | 3.0 |

The reaction zone must be included within iron boundaries to effect the process of this invention. Experiments have been made using an ordinary black iron pipe, and a low carbon (0.15 per cent carbon maximum), cold drawn, mechanical steel tube. Substantially identical results were obtained.

The reaction zone must be unpacked because every packing among about 35 which were tested had an adverse effect on the yield of chlorotrifluoroethylene. Moreover, all the prior art packings except the noble metals or carbon react with the gaseous reactants causing cementing together of the packing and plugging of the reaction zone. Furthermore, it is not practicable to use the preferred iron reaction zone with any type of packing because the packing prevents the removal of the flakes of ferrous halides which result from corrosion of the iron by the gaseous products present.

Other materials of construction and certain packings have been tried, but all gave lower or less desirable results. No form of copper gave ultimate yields within 10 per cent of those obtainable when an open iron tube was used. Supported copper catalysts are not desirable because of chemical attack and because ultimate yields are not good. This is further substantiated in C. A. Bordner Patent 2,615,925. Catalytic copper pellets (copper of greatly extended surface area) are unsuitable because of chemical attack with consequent cementing of the catalyst pellets and plugging of the reactor. Moreover, the maximum ultimate yield of chlorotrifluoroethylene obtainable with this catalytic copper was only 81.7 per cent.

The principal loss in this method was believed to be due to the complete dehalogenation of part of the "Freon" 113; and thus, suggests a different mechanism of decomposition than when an open iron tube is used. With an empty open copper tube and also with a packing of copper turnings the ratio of chlorotrifluoroethylene to undesirable by-products produced was very low.

Rather extensive investigations of the use of nickel were made and it is evident that nickel has an undesirable catalytic effect in that it promotes reactions leading to carbonization and hydrogen fluoride formation. This is particularly noticeable wtih a fresh nickel surface. After the surface has acquired a carbonaceous coating, the effect is diminished through not entirely eliminated. Thus, ultimate yields obtainable with nickel are reduced. The carbon deposits caused by the nickel constitute a difficult removal problem, and also the catalytic effect varies with the cleanliness of the tubing making it difficult to operate at a uniform conversion rate.

Good ultimate yields cannot be obtained using a graphite reactor. Carbonization and hydrogen fluoride formation are particularly pronounced under conditions severe enough to lead to high ultimate conversions of the "Freon" 113. At low ultimate conversions of "Freon" 113, the ultimate yield is poor although the degree of carbonization and HF formation is somewhat reduced. Possible pyrolysis and disproportionation reactions occur which result in formation of low boiling halogenated methanes which escape a Dry Ice condenser.

Inconel and Monel were both tried, but, like nickel, cause considerable carbonization and HF formation; hence, cannot give high ultimate yields.

Tests using platinum gauze in a nickel tube show platinum to be strongly catalytic, but inferior to an open iron tube in ultimate yield produced. No corrosion of the platinum occurred, but its expense and poor performance when compared to iron caused this material to be dropped from further consideration.

Many other packings have been tried and all gave poorer results than when using an empty iron tube. Finely divided iron or iron oxide pellets both reacted very rapidly with the hot gases, cemented together and plugged the tube in a very short time. It was also noted that "Freon" 113 alone reacts with active iron. Therefore the use of a form of iron having a highly extended surface area is not adaptable to the process of this invention.

But we have found that with the use of an unobstructed iron tube a high ultimate conversion, a high ultimate yield, low fluorine loss, no appreciable carbon loss, cheap materials of construction, no change in conversion over extended periods of time using the same tube continuously or intermittently, and low by-products can all be realized to a much greater extent than with the use of any other materials or combination of materials tested. Further, the by-products formed when using the unobstructed iron reaction zone of this invention, can be chlorinated to "Freon" 113 for re-use on this process. No other material tested has so many of the advantages as this type of reaction zone. Our results show positive evidence that the by-products formed are different from those formed when using the catalysts and materials of construction of the prior art and that in the process of the present invention, these by-products can be chlorinated back to "Freon" 113 for re-use.

The hydrogenation process effected in the iron reaction zone of this invention can be maintained at any normal pressure. However since the reaction goes satisfactorily at near-atmospheric pressures we prefer to operate at approximately atmospheric pressure.

We have also found that the admixture of anhydrous hydrogen chloride with the final mixture of hydrogen and "Freon" 113 to the extent of 50 mole per cent improved the ultimate conversion; and thus, is not detrimental to the hydrogenation process.

It is necessary to maintain close control of the iron reaction zone temperature to obtain the highest ultimate yield of chlorotrifluoroethylene. The temperature specifically should be controlled to within a 10 centigrade degree range ($\pm 5°$ C.). We prefer to operate at temperatures in the range of 575 degrees centigrade, but under certain conditions temperatures as low as about 550 degrees centigrade and as high as about 600 degrees centigrade can be used in effecting the process of this invention. However, at temperatures below about 550 degrees centigrade the reaction rate becomes too slow and at temperatures above about 615 degrees centigrade a runaway exothermic reaction resulting in extensive degradation is likely to occur.

Operation under the preferred conditions of this invention results in the formation on the walls of the iron reaction zone of small amounts of corrosion products based on the weight of the chlorotrifluoroethylene produced. These products are believed to be ferrous halides and accumulate on the surface of the iron tube in the form of loose shiny flakes resembling mica in appearance. On exposure to the atmosphere they pick up water and become dull and dark in color. Their chlorine content ranges from 30 to 50 per cent; therefore, since ferrous chloride contains 56 per cent chlorine, the corrosion products evidently are a mixture of ferrous chlorides and ferrous fluorides.

However, these corrosion products appear to have substantially no effect on the course of extent of the reaction. They accumulate on the surface of the iron or steel pipe in the reaction zone and flake off easily, so that they can be brushed out of the zone between runs readily, or, if the pipes are mounted in a vertical position, may drop out of the zone of their own weight or can be removed by occasionally vibrating, shaking or actually poking out the reactor tubes.

The relatively fast corrosion rate of the iron reaction zone requires that the reactor be designed such that the iron zone can be easily replaced. For example, a loose replaceable iron liner may be supported inside a heated nickel sleeve.

In addition, the reactor should be in a vertical position with a hopper arrangement at the bottom to catch the flaky ferrous halides as they fall or are vibrated from the sides of the iron zone. For instance, a double plug-cock system could be used to remove the scale without interrupting the operation of the process.

Feed gas flow through the vertical reactor should be upwards in the reactor for best results but under special conditions the flow can be downward too.

Although the reactor can be practically any size or shape, we prefer to use one of cylindrical iron or steel, either singular in number or plural. Heated lengths of from between two feet and twenty feet, with inside diameters from ½-inch to six inches and with wall thicknesses from ⅛-inch up may be used in effecting the process of this invention.

The gases exiting from the ferrous reaction zone first should be cooled before passing through a scrubbing system. We prefer to cool the hot gases rapidly to a temperature below about 100 degrees centigrade. This rapid cooling stops the hydrogenation reaction and prevents the possibility of hydrolysis in the scrubber. Thus in large scale operation the hot reaction product gases from the ferrous reaction zone should pass promptly through a water jacketed heat exchanger to cool the gases to a temperature below about 100 degrees centigrade and yet avoid condensation. Cooling water maintained at about 50 degrees centigrade in the jacket, but above 40 degrees centigrade, is preferred.

The cooled gaseous reaction products can be scrubbed free of halogen acids with water maintained above about 40 degrees centigrade. We prefer to maintain the water at a temperature between about 45 and about 55 degrees centigrade. In order to make the water vapor load on the drying system as light as possible, the solution temperature of the scrubbing system should be as low as possible, and yet warm enough to avoid condensation of the organic products. Muriatic acid is so obtained and may have a trace of hydrogen fluoride dissolved therein.

In large scale operation, we also prefer to follow up the water scrubbing treatment with an aqueous caustic soda scrubbing treatment to remove the last traces of halogen acids in the organic gases. Here again the solution should be maintained above about 40 degrees centigrade and within the preferred range of between about 45 and about 55 degrees centigrade.

The reaction gases scrubbed at a temperature of about 45 degrees centigrade should have about 8 pounds of water vapor per 100 pounds of chlorotrifluoroethylene. Higher scrubbing temperatures will yield even higher water-vapor contents. This water vapor should be removed in order to avoid difficulties in fractionating the organic reaction product. Drying can be accomplished by passing the gases over calcium chloride or other known solid hygroscopic substances, or the organic vapors may be dried more economically and conveniently by scrubbing in towers with sulfuric acid. We prefer to use two counter-current drying towers in series with acid in each. Fresh acid of about 96 per cent concentration is fed to the second tower and spent acid of about 77 per cent concentration is withdrawn from the first tower.

The dried gas stream comprises hydrogen, a small proportion of trifluoroethylene boiling somewhere between minus 51 and minus 60 degrees centigrade at atmospheric pressure, chlorotrifluoroethylene boiling at about minus 27 degrees centigrade at atmospheric pressure, dichlorotrifluoroethane boiling at about plus 28 degrees centigrade at atmospheric pressure, and "Freon" 113 boiling at about plus 48 degrees centigrade at atmospheric pressure. Adequate recovery of these organic constituents is obtained in a Dry Ice cooled receiver at atmospheric pressure. However if these vapors are compressed to about 95 pounds per square inch gauge, equivalent recovery may be obtained using brine for cooling at minus 20 degrees centigrade.

The condensed material can be fractionally distilled in any continuous or batchwise method, either at atmospheric or super-atmospheric pressure. To minimize labor costs and handling losses as well as to realize a more uniform product, we prefer to effect the separation continuously by means of three distillation columns.

The first column would have as feed the dried condensed organic product comprising trifluoroethylene, chlorotrifluoroethylene, dichlorotrifluoroethane and "Freon" 113; the overheads would be trifluoroethylene, chlorotrifluoroethylene, and dichlorotrifluoroethane; and the bottoms would be "Freon" 113 which can be re-used with or without additional treatment in the process of this invention.

The second column would have as feed the overheads of the first column; its overhead product would comprise trifluoroethylene; and its bottoms would comprise chlorotrifluoroethylene and dichlorotrifluoroethane.

The third column would have as feed the bottoms of the second column and separate this mixture into dichlorotrifluoroethane as bottoms and chlorotrifluoroethylene as overheads.

For intermediate levels of production a batchwise fractionation similar to that described in Example 1, may be more desirable than such a continuous one as that described above.

Among the recoverable organic by-products of the process of this invention are trifluoroethylene and dichlorotrifluoroethane. It is a preferred embodiment of this invention to chlorinate these by-products to "Freon" 113 for re-use in the process. A liquid-phase photochemical process can be set up to operate either batchwise or continuously. With batchwise chlorination, pressure would be required to permit use of a brine cooled reflux condenser; however, pressure would not be necessary where reflux condenser temperatures obtainable by Dry Ice are used. With continuous operation, pressure may not be required since the chlorinator then would contain substantially only "Freon" 113. However, the substitution chlorination is somewhat sluggish at 45 degrees centigrade, so that pressure may be desired to permit a higher chlorination temperature to increase the rate of substitution chlorination. Alternatively there may be advantages to using a continuous vapor phase chlorination at atmospheric pressure and elevated temperatures.

The chlorination product resulting from the chlorination of the recoverable organic by-products of this invention may be degassed of hydrogen chloride and unreacted chlorine, such as by refluxing under brine cooled condenser. The resulting liquid "Freon" 113 can be combined with the main body of unreacted "Freon" 113 and distilled through a short fractionating column using a brine cooled condenser at atmospheric pressure to further purify it before re-use as feed to the iron reaction zone, or it may be re-used directly.

Since chlorotrifluoroethylene is quite sensitive to oxygen while undergoing polymerization, precautions should be taken to avoid the presence of traces of oxygen entering the process of this invention and possibly contaminating the chlorotrifluoroethylene. Purge gases such as nitrogen or carbon dioxide should be oxygen free. Solutions in the scrubbing operations should first be deoxygenated, such as by boiling or by vacuum treatment to remove dissolved air, or a low concentration of sodium hydrosulfite can be maintained in the aqueous caustic scrubber to chemically remove free oxygen, and the drying system should also be freed of oxygen before use, as well as the entire apparatus. We prefer to use a chemical deoxygenator in a caustic solution used jointly to remove last traces of both hydrogen halides and oxygen.

The following examples are given to further illustrate our invention but we do not wish to be limited thereto except as defined in the appended claims. In these examples, the commercial "Freon" 113 referred to therein was a commercial grade which contained about 5 per cent of 1,1,1-trichloro-2,2,2-trifluoroethane.

*Example 1*

After purging the system with an inert gas (nitrogen), "Freon" 113 and hydrogen were metered in a mole ratio of 4.0 to 1.0 into a steam jacketed vaporizer and from thence the warm vapors were passed into an insulated four-foot length of ¾-inch diameter standard black iron pipe, the central three feet of which were wound with Nichrome ribbon for electrical heating and equipped with a thermocouple well of ¼-inch diameter iron tubing 3.5 feet long. The iron reaction zone within the pipe was maintained at a temperature of 575 degrees centigrade. The feed ratio was adjusted such that the contact or retention time of the vapors in the open iron reaction zone was 2 seconds, assuming the vapors to be ideal gases. The products leaving the reactor were then passed through a 3-to-5 inch section of ¾-inch black iron pipe cooled on the outside with tap water and from thence through 18 inches of ¼-inch nickel tubing and entered a water scrubber at a temperature below 100 degrees centigrade. These gases then bubble through a 4-liter suction flask used as the water scrubber and maintained at a temperature of about 50 degrees centigrade. The water scrubber removed any of the water-soluble products such as HCl, and helped to cool the hot reaction gases. The gases which did not dissolve in the water, exited from the water scrubber and were then dried over calcium chloride and passed into a balloon flask receiver immersed in and maintained cold by a dry ice and acetone bath. Here most of the organic gases condensed out. Any vent gases from this balloon flask receiver were passed into a second trap maintained cold by a Dry Ice acetone bath to minimize losses. The run was terminated after 700 milliliters of the commercial "Freon" 113 had been fed.

The contents trapped in the water scrubber were examined and found to be predominantly hydrochloric acid with only a trace of hydrogen fluoride. The inside walls of the black iron pipe reactor were examined and found to have substantially no evidence of carbonization, but a moderate amount of metal halides were observed on the walls in the form of shiny flakes.

The contents of the two cold receivers were combined and carefully fractionated in a ½-inch by four-foot insulated glass column packed with ⅛-inch glass helices, the reflux condenser and receiver being cooled with Dry Ice. This fractionation showed that 18.1 per cent of the com-

TABLE 3

*The hydrogenation of commercial "Freon" 113 to chlorotrifluoroethylene*

| Example Number | Mole Ratio, Commercial [1] "Freon" 113/$H_2$ | Iron Reaction Zone Temp., °C. | Retention Time in Seconds | Vol. of Liq., Comm.[1] "Freon" 113 Fed in Milliliters | HF in HCl Mole Percent | Carbonization in Reaction Zone | Gross Conversion (Uncorrected),[1] Percent | Yield of Recovered Reacted Products | | | |
|---|---|---|---|---|---|---|---|---|---|---|---|
| | | | | | | | | Trifluoroethylene, Percent | Chlorotrifluoroethylene, Percent | Dichlorotrifluoroethane, Percent | Total Yield, Percent |
| 1 | 4.0 to 1.0 | 575 | 2.0 | 700 | Trace | None | 18.8 | 5.6 | 81.0 | 8.9 | 95.5 |
| 2 | 4.0 to 1.0 | 575 | 1.6 | 800 | None | None | 16.6 | 7.1 | 84.7 | 3.8 | 95.6 |
| 3 | 2.0 to 1.0 | 588 | 2.0 | 800 | 2.6 | Trace | 36.3 | 6.5 | 79.0 | 7.8 | 93.3 |
| 4 | 1.0 to 1.0 | 585 | 3.0 | 800 | 4.0 | Trace | 63.2 | 16.0 | 56.7 | 18.1 | 90.8 |
| 5 | 2.0 to 1.0 | 585 | 2.0 | 800 | 3.0 | Trace | 39.7 | 7.3 | 70.3 | 11.8 | 89.4 |
| 6 | 3.0 to 1.0 | 575 | 2.0 | 800 | 3.3 | Trace | 25.7 | 11.2 | 76.6 | 7.6 | 95.4 |
| 7 | 3.0 to 1.0 | 560 | 5.0 | 700 | 4.2 | Trace | 39.0 | 12.8 | 61.2 | 16.1 | 90.1 |
| 8 | 2.0 to 1.0 | 600 | 1.0 | 800 | 2.8 | Trace | 27.0 | 9.7 | 77.6 | 11.5 | 98.8 |
| 9 | 2.0 to 1.0 | 575 | 2.0 | 800 | 2.3 | Trace | 31.8 | 6.9 | 74.8 | 14.2 | 95.9 |
| 10 | 2.0 to 1.0 | 575 | 2.0 | [2] 810 | 2.6 | Trace | | 7.8 | 63.3 | 20.7 | 91.8 |
| 11 | 2.0 to 1.0 | 575 | 2.0 | [3] 800 | 2.9 | Trace | | 7.1 | 66.0 | 23.7 | 96.8 |

[1] The commercial "Freon" 113 used contained 5 percent 1,1,1-trichloro-2,2,2-trifluoroethane.
[2] The recovered "Freon" 113 and intermediate dichlorotrifluoroethane fraction from Example 9 were combined with make-up "Freon" 113.
[3] The recovered "Freon" 113 and intermediate dichlorotrifluoroethane fraction from Example 10 were combined with make-up "Freon" 113.

mercial "Freon" 113 had been converted, the remainder being recovered for re-use, and the gross yield of product was as follows: trifluoroethylene, 5.6 per cent; dichlorotrifluoroethane, 8.9 per cent; and chlorotrifluoroethylene, 81.0 per cent. Thus, the gross yield of recovered reacted products was 95.5 per cent with only 4.5 per cent being irrecoverably lost.

Table 3 shows the results of several representative runs conducted in equipment substantially the same as that used in the run of Example 1, except that a low carbon steel pipe was used instead of a black iron pipe. The tabular results of Example 1 are also shown for comparison purposes, since black iron and low carbon steel are both ferrous metals (iron metals) and showed substantially no differences in the results in effecting the process of this invention.

Example 12

Using substantially the same apparatus and operating conditions as in Example 9, a run was made feeding 2400 milliliters (19.0 moles) of commercial "Freon" 113. From this run the foreshot trifluorothylene fraction and intermediate dichlorotrifluoroethane fractions were combined and chlorinated photochemically in the liquid phase at reflux temperature under atmospheric pressure using a Dry Ice cooled reflux condenser. The initial temperature of about minus 20 degrees centigrade gradually rose to plus 48 degrees centigrade as the chlorination progressed to completion. Chlorination proceeded first by addition to the unsaturated compounds and then by substitution with evolution of HCl to the saturated hydrogen-containing compounds. The chlorinated product was carefully fractionated using the distillation apparatus referred to in Example 1, and was found to contain 288 grams (1.54 moles) of "Freon" 113 and 22 grams (0.10 moles based on the empirical formula $C_2Cl_5F$) of higher boiling liquids. The "Freon" 113 content was thus 93.8 mole per cent of the chlorinated by-products. This "Freon" 113 can be combined with the feed "Freon" 113 for use in the process.

In this manner over 90 per cent of the by-products can be recovered as "Freon" 113, and ultimately as chlorotrifluoroethylene. In other words, the net yield of chlorotrifluoroethylene is substantially the same as the total yield of recovered reacted products (e. g. the results shown in the total yield column of Table 3).

We claim:

1. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of between about 0.2 to 1.0 and about 4.0 to 1.0 into an unobstructed iron reaction zone maintained at a temperature between about 550 and about 600 degrees centigrade; and withdrawing the products so produced.

2. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of between about 1.0 to 1.0 and about 4.0 to 1.0 into an unobstructed iron reaction zone maintained at a temperature between about 550 and about 600 degrees centigrade; retaining the vapors in the said zone for a time sufficient to effect a conversion of between about 15 per cent and about 63 per cent of the "Freon" 113; and withdrawing the products so produced.

3. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of about 2.0 to 1.0 into a zone contained in an unobstructed iron pipe maintained at a temperature between about 570 and about 580 degrees centigrade; maintaining the vapors in said zone for a time sufficient to effect a conversion of about between 30 per cent and about 45 per cent of the "Freon" 113; and withdrawing the products so produced.

4. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of from between about 1.0 to 1.0 and about 4.0 to 1.0 into an unobstructed iron reaction zone maintained at a temperature of between about 550 and about 600 degrees centigrade; maintaining the vapors in the said zone for a period of between about 1.5 and about 3.0 seconds; and withdrawing the products so produced.

5. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of about 2.0 to 1.0 into a zone contained in an unobstructed iron pipe maintained at a temperature of about 570 and 580 degrees centigrade; retaining the vapors in said zone for a period of about 2.0 seconds; and withdrawing the products so produced.

6. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of from between about 1.0 to 1.0 and about 4.0 to 1.0 into an unobstructed iron reaction zone maintained at a temperature of between about 550 and about 600 degrees centigrade; withdrawing the products so produced; and recycling the unreacted "Freon" 113.

7. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of between about 1.0 to 1.0 and about 4.0 to 1.0 into an unobstructed iron reaction zone maintained at a temperature of between about 550 and about 600 degrees centigrade; retaining the vapors in the said zone for a time sufficient to effect a gross conversion of between about 15 per cent and about 63 per cent of the "Freon" 113; withdrawing the products so produced; and recyling the unreacted "Freon" 113.

8. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of about 2.0 to 1.0 into a zone contained in an unobstructed iron pipe maintained at a temperature between about 570 and about 580 degrees centigrade; maintaining the vapors in said zone for a time sufficient to effect a gross conversion of between about 30 per cent and about 45 per cent of the "Freon" 113; withdrawing the products so produced; and recycling the unreacted "Freon" 113.

9. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of from between about 1.0 to 1.0 and about 4.0 to 1.0 into an unobstructed iron reaction zone maintained at a temperature of between about 550 and about 600 degrees centigrade; maintaining the vapors in the said zone for a period of between about 1.5 and about 3.0 seconds; withdrawing the product so produced; and recyling the unreacted "Freon" 113.

10. In a method for producing chlorotrifluoroethylene ($ClFC=CF_2$), the improvement which comprises: introducing vapors of 1,1,2-trichloro-1,2,2-trifluoroethane ("Freon" 113) admixed with hydrogen in a molar ratio of about 2.0 to 1.0 into an unobstructed iron reaction zone maintained at a temperature of between about 570 and about 580 degrees centigrade; retaining the vapors in the said zone for a period of about 2.0 seconds; withdrawing the products so produced; and recycling the unreacted "Freon" 113.

11. In a method for producing chlorotrifluorethylene (ClFC=CF₂), the improvement which comprises: introducing as starting materials the vapors of 1,1,2-trichloro-1,2,2-trifluoroethane ("Freon" 113) admixed with hydrogen in a molar ratio of from between about 1.0 to 1.0 and about 4.0 to 1.0 into an unobstructed iron reaction zone maintained at a temperature of between about 550 and about 600 degrees centigrade; removing the hydrogen halides from the effluent organic products; separating the chlorotrifluoroethylene from the organic products; perchlorinating remaining organic product to form a product comprising "Freon" 113; and recycling "Freon" 113 for use as starting material.

12. In a method for producing chlorotrifluoroethylene (ClFC=CF₂), the improvement which comprises: introducing as starting materials the vapors of 1,1,2-trichloro-1,2,2-trifluoroethane ("Freon" 113) admixed with hydrogen in a molar ratio of from between about 1.0 to 1.0 and about 4.0 to 1.0 into an unobstructed iron reaction zone maintained at a temperature of between about 550 and about 600 degrees centigrade; retaining the vapors in said zone for a time sufficient to effect a net conversion of between about 12 per cent and about 51 per cent of the "Freon" 113; removing the halogen halides from the organic products; perchlorinating remaining organic product to form a product comprising "Freon" 113; and recycling "Freon" 113 for use as starting material.

13. In a method for producing chlorotrifluoroethylene (ClFC=CF₂), the improvement which comprises: introducing as starting materials the vapors of 1,1,2-trichloro-1,2,2-trifluoroethane ("Freon" 113) admixed with hydrogen in a molar ratio of about 2.0 to 1.0 into a zone contained in an unobstructed iron pipe maintained at a temperature between about 570 and about 580 degrees centigrade; retaining the vapors in said zone for a time sufficient to effect a net conversion of between about 24 per cent and about 36 per cent of "Freon" 113; removing the hydrogen halides from the effluent organic products; separating the chlorotrifluoroethylene from the organic products; perchlorinating remaining organic product to form a product comprising "Freon" 113; and recycling "Freon" 113 as starting material.

14. In a method for producing chlorotrifluoroethylene (ClFC=CF₂), the improvement which comprises; introducing as starting materials the vapors of 1,1,2-trichloro-1,2,2-trifluoroethane ("Freon" 113) admixed with hydrogen in a molar ratio of from between about 1.0 to 1.0 and about 4.0 to 1.0 into an unobstructed iron reaction zone maintained at a temperature of between about 550 and about 600 degrees centigrade; retaining the vapors in said zone for a period of between about 1.5 and about 3.0 seconds; removing the hydrogen halides from the effluent organic products; separating the chlorotrifluoroethylene from the organic products; perchlorinating remaining organic product to form a product comprising "Freon" 113; and recycling "Freon" 113 as starting material.

15. In a method for producing chlorotrifluoroethylene (ClFC=CF₂), the improvement which comprises; introducing as starting materials the vapors of 1,1,2-trichloro-1,2,2-trifluoroethane ("Freon" 113) admixed with hydrogen in a molar ratio of about 2.0 to 1.0 into a zone contained in an unobstructed iron pipe maintained at a temperature between about 570 and about 580 degrees centigrade; retaining the vapors in said zone for a period of about 2.0 seconds; removing the hydrogen halides from the effluent organic products; separating the chlorotrifluoroethylene from the organic products; perchlorinating the remaining organic product to form a product comprising "Freon" 113; and recycling "Freon" 113 as starting material.

16. In a method for producing chlorotrifluoroethylene (ClFC=CF₂), the improvement which comprises; introducing as starting materials the vapors of 1,1,2-trichloro-1,2,2-trifluoroethane ("Freon" 113) admixed with hydrogen in a molar ratio of about 2.0 to 1.0 into a zone contained in an unobstructed iron pipe maintained at a temperature between about 570 and about 580 degrees centigrade; retaining the vapors in said zone for a period of about 2.0 seconds; removing the hydrogen halides from the effluent organic products; separating the hydrogen halides, the chlorotrifluoroethylene, and the organic by-products from the unreacted "Freon" 113; chlorinating the organic by-products to form a product comprising at least 90 mole per cent "Freon" 113; combining this "Freon" 113 with the unreacted "Freon" 113 for recycling as starting material.

References Cited in the file of this patent

UNITED STATES PATENTS

| | | |
|---|---|---|
| 2,504,919 | Bordner | Apr. 18, 1950 |
| 2,615,926 | Benning et al. | Oct. 28, 1952 |
| 2,685,606 | Clark | Aug. 3, 1954 |
| 2,697,124 | Mantell | Dec. 14, 1954 |
| 2,704,775 | Clark | Mar. 22, 1955 |

FOREIGN PATENTS

| | | |
|---|---|---|
| 698,386 | Great Britain | Oct. 14, 1953 |